June 14, 1949.　　　　B. A. NICOLAEFF　　　　2,472,917
ROTARY AIRCRAFT ATHODYD MOTOR
Filed Jan. 24, 1948　　　　　　　　　　　　2 Sheets-Sheet 2
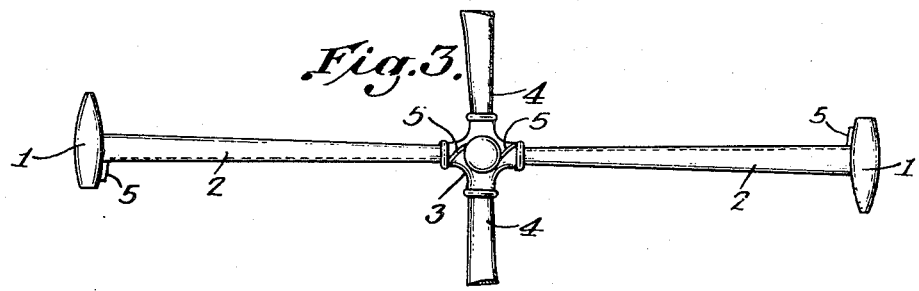
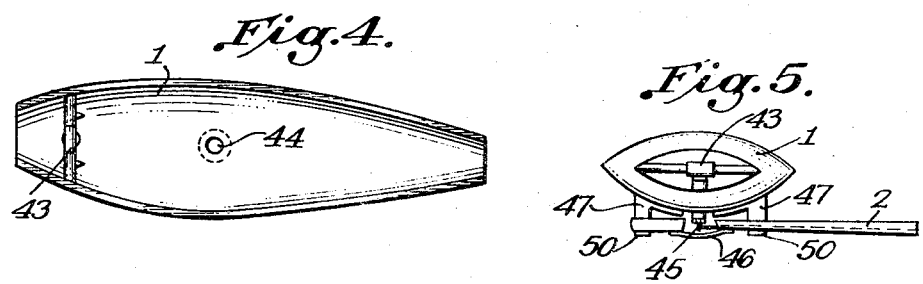
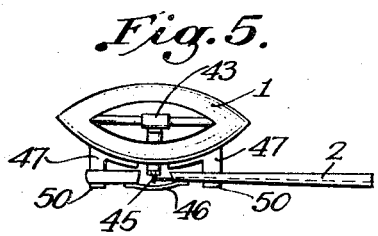
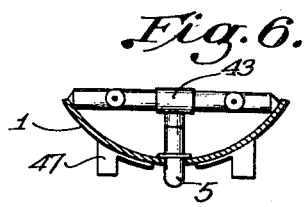
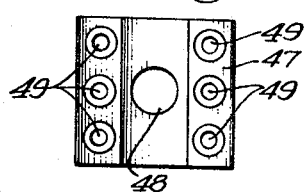
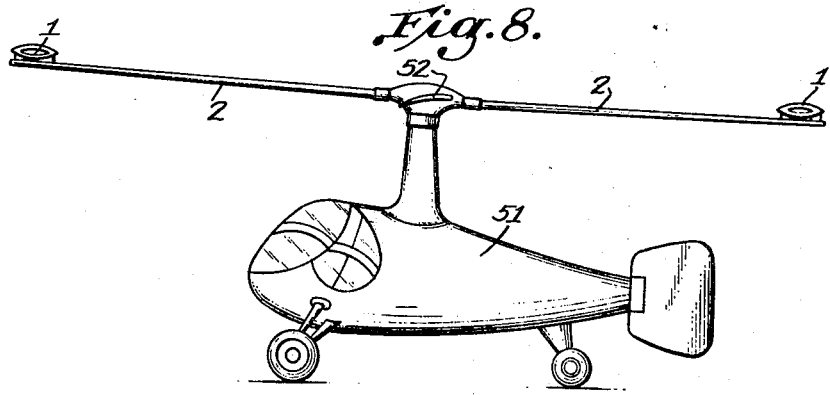
Inventor,
Boris A. Nicolaeff Patented June 14, 1949

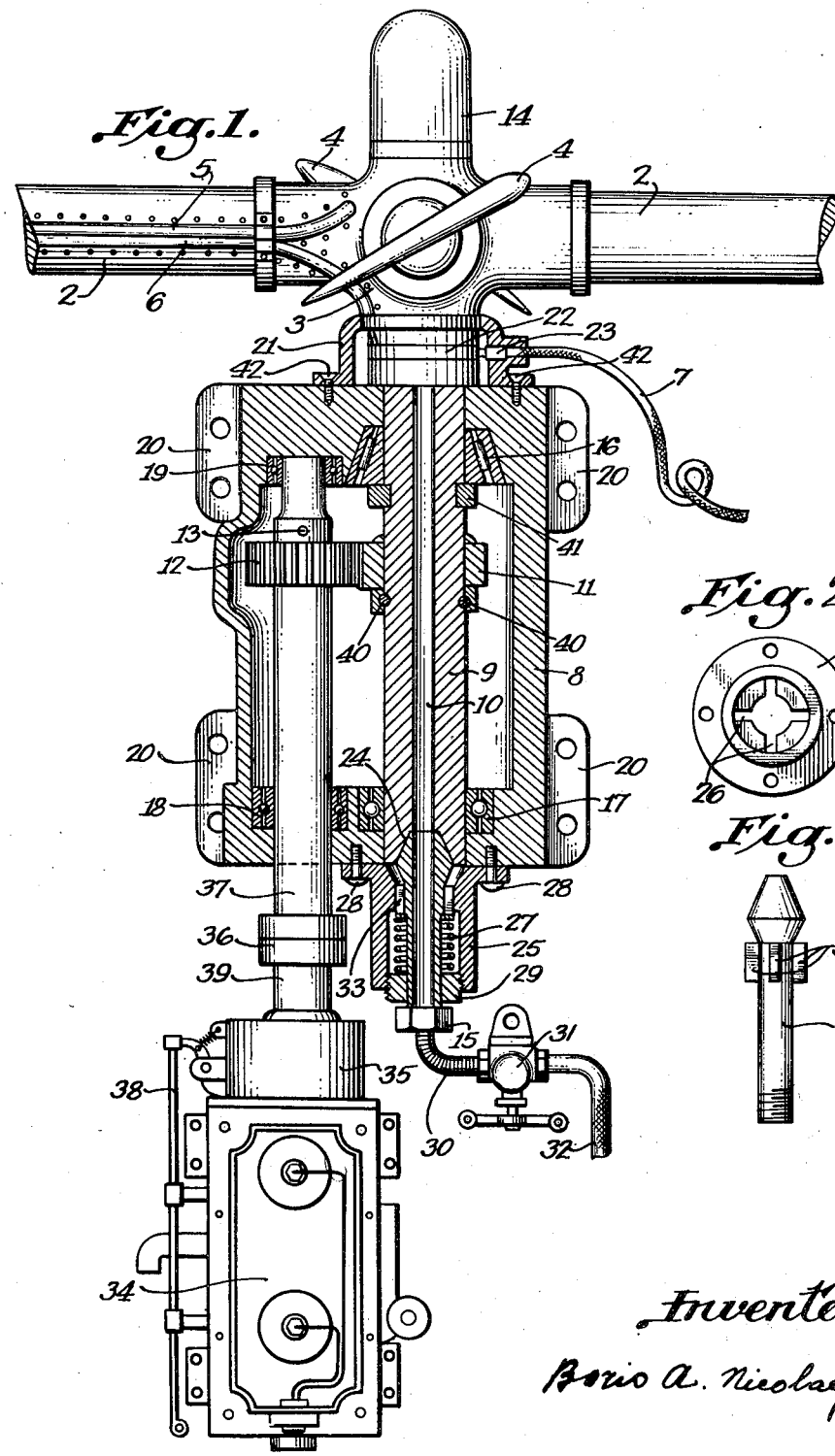

2,472,917

UNITED STATES PATENT OFFICE 2,472,917

ROTARY AIRCRAFT ATHODYD MOTOR

Boris A. Nicolaeff, Montreal, Quebec, Canada

Application January 24, 1948, Serial No. 4,162

3 Claims. (Cl. 170—135.4)

The invention relates to aircraft propulsion motor, which in its operation uses athodyd or aero-thermodynamic duct, the simplest of all thermo-dynamic engines. The athodyd cannot be used to push aircraft directly since it requires considerable speed of motion before it will start to operate, and to attain a reasonable efficiency it should be in motion, at a speed around 700 miles per hour. I therefore do not use athodyd tubes to push the airplane directly forward, but I use athodyd tubes in conjunction with a variable pitch propeller, to rotate the same. To obtain this end I use two or more aero-thermodynamic ducts, mounted on individual arms; said arms are attached to a hub and rotate at considerable speed on a shaft.

The object of my invention is to provide a simple power plant for aircraft, which can be built at low cost and which will have a minimum of parts. Another object of my invention is to eliminate the torque in helicopter type of aircraft and considerably reduce the weight of the motor, which drives the lifting rotor blades. Still another object of my invention is to simplify the repair and maintenance of the motor.

In describing the invention reference will be made to the attached drawings, in which: Fig. 1 shows the rotary athodyd motor in a side view with its starting motor and hub assembly, the fuel feed system, bearings and gear box case shown in a sectional view; Fig. 2 and Fig. 2a shows the details of fuel feed mechanism; Fig. 3 shows the construction of the arms and disposition of athodyd tubes in relation to the arms; Fig. 4 illustrates the athodyd tube proper with fuel injector and spark plug hole; Fig. 5 shows side view of athodyd tube mounted on its arm; Fig. 6 shows a section of the lower part of the athodyd tube and method of mounting the fuel injector with fuel pipe; Fig. 7 shows a mounting plate by means of which the athodyd tube is connected with the arm; Fig. 8 shows a side view of helicopter using the athodyd to rotate its main rotor blades.

Referring to Fig. 1: the arms 2 engage the hub 3 which at the same time is the hub for variable pitch propeller blades 4; said blades are at right angles to the arms 2. The blades 4 are actuated by the mechanism enclosed in cover 14, no details of which are shown since I do not claim as my invention the variable pitch propeller. The hub 3 is fastened securely to shaft 9, with which it rotates during operation. The shaft 9 has a passage or canal 10 bored in the exact center, and running the entire length of the shaft 9. This passage is for the purpose to pass the fuel to the athodyd tubes situated on the ends of the arms 2, said arms are not fully shown in this figure, but are shown in Fig. 3. The end of the shaft 9 which is inside the hub 3 is threaded to receive a T connection to which are connected two fuel feed pipes 5, only one is shown in the Fig. 1 because the other is situated on the back of the right arm 2, said pipes connect the athodyd tubes to the shaft 9 passage 10 and in them the fuel goes to the respective fuel injectors, inside the athodyd tubes. Fuel feed pipe 5 extends the hub case 3 and is fastened to it and the arm 2 by means of the protective covering, said covering may be welded or fastened by small screws to the arms 2 bodies, in this covering are also running parallel to the pipes 5 ignition wires 6 over which electrical current goes to the spark plug or ignitors. The other end of the shaft 9 has a cavity bored at the exact center to engage the fuel feed plug 24. The shaft 9 has an adjustable split collar 41, said collar serves as a thrust collar. The bearings case 8 which is shown in sectional view has inside it bearings 16, 17, 18, and 19. On the bearings 16 and 17 the shaft 9 rotates; bearing 16 is a main thrust bearing of the roller type the others are of the ball bearing type. On bearings 18, 19 rotate shaft 37 connected by universal joint 36 to the clutch shaft of the starting motor 34. On this shaft 37 is mounted gear 12 which is held by the pin 13; this gear engages gear 11 on the shaft 9, held in place by pins 40, and transmits power during starting of the athodyd motor, but during the operation of the athodyd motor is only idling. The starting motor is disconnected by the clutch 35. The bearings case is fastened to its support in the aircraft by means of flanges 20, which have holes drilled for the bolts. Engaging the shaft 9 cavity, previously mentioned, is a fuel feed plug 24; said plug is held in position by means of the cylindrical support 25; said support has a partition with slots engaging the flanges 33 of the plug 24 and therefore preventing the plug 24 from being rotated, when shaft 9 turns during the operation of the motor. The other end of the plug 24 passes through the round hole of the nut 29, threaded outside. Nut 29 engages the threaded portion of the support 25; said nut 29 may be adjusted to give more or less tension to the spring 27, which purpose is to hold the plug 24 against the conical cavity of the shaft 9 in tension, so as to establish a positive and leakproof connection between the plug 24 and the shaft passage 10. The end of the plug 24 is threaded, to engage the union 15 of the flexible pipe 30, which is connected with the control valve 31, which valve will admit more or less fuel to the athodyd tubes; it may be manipulated by controlling cables connecting it to the pilot control board. From valve 31 extends pipe 32, which connects with the fuel tank of the aircraft. A fuel filter is desirable in this connection to make sure that small particles in the fuel would not clog the injectors.

Referring to the starting motor 34; this motor may be a gasoline engine of suitable power to rotate the athodyd tubes and give them a starting speed around 325 miles per hour, at which speed the athodyd tubes will start to work by themselves. After the athodyd motor is started, this motor is disconnected by the clutch 35 and may be completely stopped. The rod 38 shown in the drawing actuates the clutch mechanism. 39 is the clutch shaft connecting to the universal joint 36. The screws 28 hold the fuel feed plug support 25. Fig. 2 shows the end view of the fuel feed plug support 25 with slots 26 into which engages fuel feed plug 24, with the flanges 33 shown in Fig. 2a. Fuel feed plug 24 should be made of bronze metal and the conical end should be fitted to the conical cavity of the shaft 9.

Fig. 3 illustrates in a plan view the athodyd motor arms (2) and hub (3) assembly. The athodyd tubes 1 are fastened to the ends of the respective arms at right angles to the arms 2. The size of the arms will depend on the type of the aircraft in which the motor will be used, for an airplane an arm of 60 inches long is suitable, but for a helicopter the arms may be up to 25 ft. long, depending on the type of lifting rotor blades. The arms are fastened to the hub 3 in such position that the athodyd tubes are in the same plane in respect to each other. The arms 2 should be perfectly balanced, after they are completely assembled. The arms outline must be streamlined as much as possible to reduce air resistance and they should have a smooth surface. The fuel feed pipes 5 go along the edges of their respective arms and are shown in dotted lines. They enter the athodyd tubes near their front ends. Fig. 4 shows a sectional view of the lower part of the athodyd tube. The fuel injector 43, which is situated not far from the air entrance of the tube. A hole 44 is provided for the purpose to insert a spark plug or ignitor; this hole is reinforced by a threaded bushing which is welded to edges of the hole 44 into which the spark plug may be screwed on. The spark plug used should be short in length and with the best insulator. The athodyd tube 1 body should be made of heat resisting alloy metal as it is subjected to a temperature of about 1400 degrees F., and in view of its special shape must be made in two parts, which may be joined together by welding. To dissipate the heat generated in the walls, the walls may be covered with heat-absorbing material.

Fig. 5 is a side view of an athodyd tube mounted on the end of the arm 2; it is fastened to the arm by means of the mounting plate 47, said plate is secured to the arm 2 end by threaded bolts 50. The arm 2 end has a round opening for the spark plug 45, and a cover 46 to protect the spark plug connecting wire; the cover is held in place by small machine screws. The dotted line denotes ignition wire and fuel feed pipe. The fuel feed pipe is not shown, for clarity, but should be provided with a union joint connection to facilitate the removal of the athodyd tube from the arm 2. 43 is the fuel injector.

Fig. 6 shows a sectional view of the lower part of the athodyd tube 1. The injector 43 has two orifices through which the fuel is sprayed, and in the middle part of the injector, there is a T connection to which the fuel feed pipe 5 is connected. This T is also a part of the injector itself. Mounting plate 47 which holds the athodyd tube is welded to it and is not removable. The injector ends are held in place by welding them to the walls of the athodyd tube. The fuel feed pipe 5 is also welded in place after it is connected to the injector. The pipe 5 enters the anthodyd through the hole in the wall.

Fig. 7 illustrates the mounting plate 47; this plate is concave in its shape and has six round flanges with threaded holes 49. The mounting plate is welded to the athodyd body and is fastened to the arm with threaded bolts engaging holes 49. It also has a round opening 48 for the spark plug.

Fig. 8 is a side view of the helicopter 51 in which the rotary athodyd motor is used. The arms 2 of the motor are fastened to the hub assembly of the lifting rotor of the helicopter; the athodyd tubes are on the ends of the arms and the blades of helicopter are at right angles to the arms. The starting motor is used to give initial speed to the athodyd tubes, but it should be coupled to the motor shaft by means of two bevel gears, since the plane of rotation of the arms is horizontal instead of vertical as in the airplane. The size of the arms will be much longer in a helicopter motor than an airplane motor; the variable-pitch mechanism is not needed; the helicopter has its own pitch control. The athodyd motor in a helicopter will eliminate the torque produced by the reciprocating engines. 52 designates helicopter rotor blades.

The ignition system of the rotary aircraft athodyd motor consists of a storage battery, vibrator type spark coil; said spark coil high tension positive terminal is connected to wire 7 of the motor; see Fig. 1. A switch is used in the primary circuit of the coil to switch ignition on or off at will. The negative wire is connected to the case 8. The Bakelite covering 21 is made in two parts to facilitate the removal and inspection of the brush 23; said covering is held in place by screws 42 passing through its flange. On the shaft 9, near the hub, is a slip ring 22, insulated from the shaft by an insulation sleeve; said slip ring is connected to wires 6 which go to the respective spark plugs on the athodyd tubes. The brush 23 is held against the slip ring by a small spring. The lubrication of the motor is not shown in the drawing but all necessary passages for the oil must be made for all bearings 16, 17, 18, 19 and fuel feed plug 24.

The fuel tank for the athodyd motor should have an extra threaded hole for connection of the air pressure pipe to supply air into the tank for building up the pressure inside it, since the athodyd motor injectors require some pressure, to spray the fuel effectively. A small air pump, driven by electric motor, supplies air to the tank, and an air-pressure gauge will indicate the pressure of the tank. A revolution counter should be installed on the shaft 37 of the motor to indicate the number of revolutions of the main shaft 9 per minute. The operation of rotary athodyd motor is checked by this counter. To start the motor, the air pressure in the fuel tank has to be checked to insure efficient operation of the injectors, pitch control of the variable pitch propeller should be set at zero pitch angle, and fuel control valve set closed completely. The starting motor, which has its own small fuel tank, should be started and when it warms enough, the clutch should be engaged and the athodyd arms 2 will start to rotate; the ignition then should be switched on and fuel control valve opened, but not fully, if the athodyd tubes are operating, which will be indicated by a flame coming from their nozzles. The starting motor then may be disconnected by the clutch; the control valve then may be opened to nearly full position, and by increasing the pitch of the variable-pitch propeller the aircraft will be put in motion. The revolution counter will also indicate if the athodyds operate properly. To stop the motor, close the fuel control valve, to stop the flow of fuel to athodyd tubes.

Having described the invention in this form I desire that it be understood that the rotary aircraft athodyd motor may be used in other form; the motor may be coupled to a separate propeller and will drive it at some distance from itself, and the plane of rotation of the athodyds may be at a right angle to that of the propeller.

I claim:

1. A rotary aircraft athodyd motor, operating by the force of reaction of high speed jets comprising rotating aero-thermodynamic ducts, radial arms, each duct mounted on the end of an individual arm, with the ducts disposed at the right angles to their respective arms, a shaft, a hub, the individual arms being connected to and fastened to said hub, each of the said ducts having a fuel injector and ignitor plug, with fuel feed pipes and ignition wires running along their respective arms, a fuel feed system to feed the duct's injectors comprising a passage for fuel, bored along the entire length of the shaft, a conical cavity on the end of the shaft and a spring-actuated fuel feed plug with adjustable tension, a support for said plug comprising, a slotted partition to hold said plug in stationary position, the end of said fuel plug engaging the conical cavity of the shaft to establish continuous connection between them, a fuel control valve to control the flow of fuel to the injectors, a case with bearings to hold the shaft and fuel feed support, and means to start the shaft in rotation comprising an additional shaft coupled to the hub shaft by means of two gears, said additional shaft operated by an auxiliary starting motor equipped with a clutch, spark plugs, an insulated slip ring on the shaft, near the hub, and a sliding brush in contact with the said ring to connect the ignition system to the spark plugs.

2. The combination of a rotary aircraft athodyd motor as defined in claim 1 and a variable pitch propeller, said propeller blades being mounted on the said common hub, and disposed at right angles to the arms of the motor.

3. The combination of a rotary aircraft athodyd motor as defined in claim 1 and a helicopter lifting comprising blades, the said arms being disposed at right angles to the helicopter blades and rotating them, thereby eliminating the torque force produced by reciprocating engines.

BORIS A. NICOLAEFF.

REFERENCES CITED

The following references are of record in the file of this patent:

UNITED STATES PATENTS

| Number | Name | Date |
| --- | --- | --- |
| 1,032,699 | Payne | July 16, 1912 |
| 2,142,601 | Bleecker | Jan. 3, 1939 |
| 2,397,357 | Kundig | Mar. 26, 1946 |

FOREIGN PATENTS

| Number | Country | Date |
| --- | --- | --- |
| 20,730 | Great Britain | 1908 |
| 227,151 | Great Britain | Jan. 12, 1925 |
| 423,590 | France | Apr. 21, 1910 |